United States Patent
Lecordix et al.

(10) Patent No.: US 9,879,561 B2
(45) Date of Patent: Jan. 30, 2018

(54) TURBOMACHINE COMPRISING A PLURALITY OF FIXED RADIAL BLADES MOUNTED UPSTREAM OF THE FAN

(71) Applicant: SNECMA, Paris (FR)

(72) Inventors: Jean-Loic Herve Lecordix, Blandy les Tours (FR); Nils Bordoni, Melun (FR); Guillaume Patrice Kubiak, Saint Pierre du Perray (FR)

(73) Assignee: SNECMA, Paris (FR)

( * ) Notice: Subject to any disclaimer, the term of this patent is extended or adjusted under 35 U.S.C. 154(b) by 353 days.

(21) Appl. No.: 14/626,452

(22) Filed: Feb. 19, 2015

(65) Prior Publication Data
US 2016/0069205 A1 Mar. 10, 2016

Related U.S. Application Data

(63) Continuation-in-part of application No. 14/418,670, filed as application No. PCT/FR2013/051818 on Jul. 29, 2013.

(30) Foreign Application Priority Data

Aug. 9, 2012 (FR) ..................................... 12 57742

(51) Int. Cl.
F01B 25/00 (2006.01)
F01D 17/16 (2006.01)
(Continued)

(52) U.S. Cl.
CPC ............ F01D 17/162 (2013.01); F02C 7/042 (2013.01); F02C 9/20 (2013.01); F05D 2220/36 (2013.01)

(58) Field of Classification Search
CPC .......... F01D 17/162; F02C 7/042; F02C 9/20; F02C 9/22; F05D 2220/36; F04D 29/563; Y02T 50/671; F02K 3/06
See application file for complete search history.

(56) References Cited

U.S. PATENT DOCUMENTS 3,299,638 A * 1/1967 Santamaria ......... B64C 29/0025
239/265.19
3,861,822 A * 1/1975 Wanger ................. F04D 29/563
415/147
(Continued)

FOREIGN PATENT DOCUMENTS

DE 767 258 C 5/1952
FR 2 360 758 A1 3/1978
(Continued)

OTHER PUBLICATIONS

U.S. Appl. No. 14/626,507, filed Feb. 19, 2015, Lecordix.
(Continued)

*Primary Examiner* — Jessica Cahill
(74) *Attorney, Agent, or Firm* — Oblon, McClelland, Maier & Neustadt, L.L.P.

(57) ABSTRACT

A bypass turbine engine including: an inner casing, an inter-duct casing and an outer casing so as to define a primary duct between the inter-duct casing and the inner casing, and a secondary duct between the inter-duct casing and the outer casing; a rotary shaft including, at an upstream end, a movable fan with radial blades of which the free ends face the outer casing to compress an air flow at least in the secondary duct; a plurality of variable-pitch radial stator vanes mounted upstream of the movable fan so as to deflect the incident axial air prior to it being axially rectified by the movable fan in the secondary duct; and a system for individually adjusting the pitch of the radial vanes including a single control ring and rods for connecting the control ring to each of said radial vanes, is provided.

25 Claims, 6 Drawing Sheets

(51) Int. Cl.
*F02C 7/042* (2006.01)
*F02C 9/20* (2006.01)

(56) References Cited

U.S. PATENT DOCUMENTS

| | | | | |
|---|---|---|---|---|
| 4,072,008 | A | | 2/1978 | Kenworth et al. |
| 4,080,785 | A | | 3/1978 | Koff et al. |
| 4,222,234 | A | | 9/1980 | Adamson |
| 4,254,619 | A | | 3/1981 | Giffin, III et al. |
| 4,400,135 | A | * | 8/1983 | Thebert ................. F01D 17/162 415/134 |
| 4,546,606 | A | * | 10/1985 | Bouiller et al. ...... F01D 17/162 60/262 |
| 5,692,879 | A | * | 12/1997 | Charbonnel .......... F04D 29/563 415/159 |
| 5,993,152 | A | * | 11/1999 | Schilling ............... F01D 17/162 415/155 |
| 8,690,521 | B2 | * | 4/2014 | Colotte .................. F01D 17/16 415/149.4 |
| 2006/0263206 | A1 | * | 11/2006 | Bouru .................. F01D 17/162 415/159 |
| 2008/0069687 | A1 | * | 3/2008 | Lace ..................... F01D 17/162 415/145 |
| 2009/0297334 | A1 | * | 12/2009 | Norris ..................... F01D 17/08 415/49 |

FOREIGN PATENT DOCUMENTS

| | | |
|---|---|---|
| FR | 2 398 890 A1 | 2/1979 |
| FR | 2 424 999 A1 | 11/1979 |
| FR | 2 688 827 A1 | 9/1993 |

OTHER PUBLICATIONS

International Search Report dated Nov. 22, 2013 in PCT/FR2013/051818 filed Jul. 29, 2013.
"Kusnezow NK-93", Wikipedia, XP055061226, Jul. 24, 2012, 3 Pages http://de.wikipedia.org/w/index.php?title=Kusnezow NK-93&oldid=105952941.

* cited by examiner

TURBOMACHINE COMPRISING A PLURALITY OF FIXED RADIAL BLADES MOUNTED UPSTREAM OF THE FAN

GENERAL TECHNICAL FIELD AND PRIOR ART

The present invention relates to the field of bypass turbine engines, in particular for an aircraft, in which air flows circulate from upstream to downstream.

FR2902142 by SNECMA discloses such a turbine engine. Conventionally, with reference to FIG. 1, the turbine engine 1 extends axially along an axis X-X and comprises an inner casing 11, an inter-duct casing 12 and an outer casing 13 so as to define a primary duct V1 between the inter-duct casing 12 and the inner casing 11, and a secondary duct V2 between the inter-duct casing 12 and the outer casing 13. In other words, the secondary duct V2 and the primary duct V1 are annular and are separated by the inter-duct casing 12.

Figure 1:
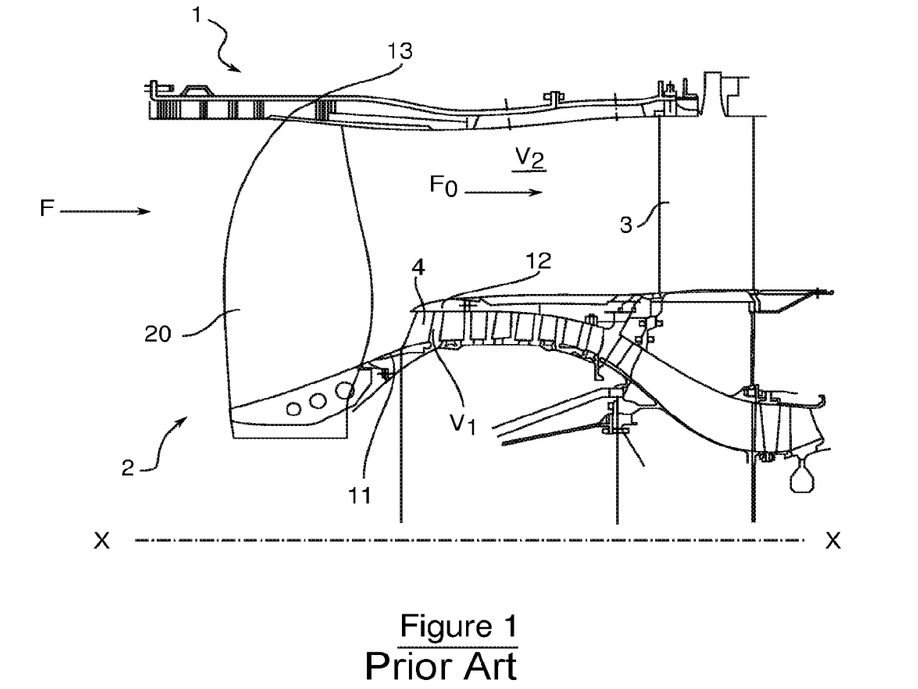
FIG. 1 is a section through a bypass turbine engine according to the prior art.

The turbine engine 1 comprises a rotary shaft comprising, at the upstream end, a movable fan 2 for compressing an incident air flow F, the movable fan 2 comprising radial blades 20 of which the free ends face the outer casing 13 of the turbine engine 1 so as to compress an air flow at least in the secondary duct V2 and, preferably, also in the primary duct V1. Conventionally, the turbine engine 1 is referred to as a ducted-fan turbine engine.

The air flow circulating in the primary duct V1 is conventionally compressed by compressor stages of the turbine engine 1 before entering the combustion chamber. The combustion energy is recovered by turbine stages which are involved in driving the compressor stages and the upstream movable fan 2. The air flow circulating in the secondary duct V2 for its part is involved in providing the thrust of the turbine engine 1.

Conventionally, the secondary duct V2 comprises, downstream of the movable fan 2, fixed radial vanes or stator vanes 3, known to a person skilled in the art as outlet guide vanes (OGV), for rectifying the air flow $F_0$ deflected by the movable fan 2 during its rotation. In a similar manner, the primary duct V1 comprises, downstream of the movable fan 2, fixed radial vanes or stator vanes 4, known to a person skilled in the art as inlet guide vanes (IGV). "Fixed vane" or "stator vane" means a vane which is not driven in rotation about the axis X-X of the turbine engine 1, that is to say by contrast with a movable blade or rotor blade of a rotor stage of the turbine engine 1.

The invention more particularly relates to turbine engines having a high bypass ratio, that is to say a ratio of deflection of air in the secondary duct V2 that is high compared with the air flow deflected in the primary duct V1. The bypass ratio (BPR) is known to a person skilled in the art and depends on the configuration of the casings 11, 12, 13 of the turbine engine (diameter, radial spacing, etc.). In the following, a "high" bypass ratio means a bypass ratio of greater than 15. In other words, for such a turbine engine 1, the flow rate of air in the secondary duct V2 is 15 times greater than the flow rate of air in the primary duct V1.

A turbine engine 1 having a high bypass ratio advantageously allows a high level of thrust to be obtained with reduced fuel consumption.

Nevertheless, the more the dimensions of the secondary duct V2 are increased, the more the diameter of the outer casing 13 is increased, which presents major drawbacks in terms of mass and drag. Another drawback of turbine engines having a high bypass ratio is that it is necessary to increase the dimensions and the mass of the thrust reversers.

In addition, a main object of the invention is to propose a turbine engine which has reduced consumption and of which the mass is also reduced.

Moreover, the greater the diameter of the outer casing 13, the greater the length of the blades 20 of the movable fan 2. In practice, for a rotational speed of the blades 20 of approximately 400 m/s, the air flow deflected by the ends of the blades 20 may reach supersonic speeds of approximately Mach 1.3, which presents drawbacks in terms of acoustics. In addition, a high speed of the air flow $F_0$ deflected by the movable fan 2 generates shockwaves in the turbine engine 1, causing a reduction of the compression efficiency. After the air flow is deflected by the movable fan 2, the air flow $F_0$ deflected in the secondary duct V2 has an axial and tangential component and needs to be rectified axially by the fixed radial vanes 3 of the OGV type. The tangential component added to the axial component of the air flow $F_0$ deflected in the secondary duct V2 by a vane 20 having a large diameter may be a source of noise in a turbine engine 1.

A further object of the invention is to propose a turbine engine having limited acoustic impact.

BRIEF DESCRIPTION OF THE INVENTION

In order to overcome some of these drawbacks, the invention relates to a bypass turbine engine, in particular for an aircraft, in which air flows circulate from upstream to downstream, the turbine engine extending axially and comprising an inner casing, an inter-duct casing and an outer casing so as to define a primary duct between the inter-duct casing and the inner casing, and a secondary duct between the inter-duct casing and the outer casing, a rotary shaft comprising, at the upstream end, a movable fan comprising radial blades of which the free ends face the outer casing of the turbine engine so as to compress an air flow at least in the secondary duct, the turbine engine comprising a plurality of variable-pitch radial stator vanes mounted upstream of the movable fan, the variable-pitch radial vanes being configured to deflect the incident axial air and the movable fan being configured to axially rectify said air deflected in the secondary duct, and means for individually adjusting the pitch of the variable-pitch radial vanes so as to allow an adaptive pitch to be provided depending on the configuration of the turbine engine.

The presence of radial stator vanes upstream of the movable fan advantageously allows the axial incident air flow to be deflected prior to being rectified by the movable fan, so that the direction of the air flow downstream of the movable fan is solely axial. In addition, it is no longer necessary to resort to fixed guide vanes or stator vanes downstream of the fan, and this makes the turbine engine lighter.

Owing to the variable pitch of the radial stator vanes, the incident air flow is adapted to the requirements of the turbine engine, that is to say to its operating state. In addition, in a given pitch position, the radial stator vanes allow an airbrake function to be provided. The turbine engine thus does not need a thrust reverser connected to the turbine engine, and this reduces its mass and complexity.

The adjustment means advantageously allow the pitch of certain variable-pitch radial vanes to be locally modified to allow, for example, a greater amount of air to circulate and to thus compensate the presence of an element, such as a strut, blocking the circulation of air downstream of the movable fan.

Advantageously, the means for individually adjusting the pitch of the radial vanes comprise a single control ring and rods for connecting said control ring to each of said radial vanes.

When it is possible, as in the case mentioned above, to link the intensity of the disruption to a flight parameter, for example the speed of the aircraft or the power of the turbine engine, the combined action of the individual-adjustment means and of the movement of the ring makes it possible to adapt the pitch of the variable-pitch radial vanes according to this flight parameter. The combined action of the individual-adjustment means and of the movement of the control ring means that at least two vanes, of a plurality of stator vanes of a rectifier, for example, can have a pitch which is different in value and/or in variation range.

The system for individually adjusting the pitch of the radial vanes using a single control ring but with a plurality of connecting rods for each vane limits the complexity of the device and the risk of malfunctions whilst allowing different pitch variations for each vane.

Preferably, the variable-pitch radial vanes have an aerodynamic profile so as to accelerate the incident air flow when it is being deflected by the variable-pitch radial vanes. In other words, the variable-pitch radial vanes allow a laminar flow of the air flow. Preferably, the aerodynamic profile of the vanes allows an acceleration of the air flow over at least 75% of the chord.

Preferably, the inner casing, the inter-duct casing and the outer casing are at a radial distance from one another in the turbine engine so as to define a turbine engine having a bypass ratio that is greater than or equal to 15. Preferably, the rotational speed of the free ends of the blades of the movable fan is less than 340 m/s. For turbine engines having a high bypass ratio, they may benefit from a high level of thrust for a movable fan driven at a slow speed, that is to say less than 340 m/s. Advantageously, high speeds are prevented from occurring when air is being deflected by the blades of the fan. Owing to the invention, the noise of turbine engines having a high bypass ratio is limited by taking advantage of the slow speed of the movable fan.

According to a preferred aspect of the invention, the plurality of variable-pitch radial vanes extend in the same plane which is transverse to the axis of the turbine engine in order to allow homogenous deflection of the incident air flow prior to it being rectified by the movable fan.

Preferably, the axial distance between the plurality of variable-pitch radial vanes and the movable fan is between 0.1 and 10 times the mean chord of a variable-pitch radial vane so as to optimise the rectification while limiting the length of the turbine engine and its nacelle.

According to the invention, the turbine engine does not comprise stator vanes mounted in the secondary duct downstream of the movable fan. The air flow deflected by the movable fan is axially rectified and does not require the presence of downstream radial vanes, and this reduces the mass and complexity of the turbine engine. In a similar manner, according to a preferred aspect of the invention, the turbine engine does not comprise stator vanes mounted in the primary duct downstream of the movable fan.

The radial stator vanes which are capable of rectifying a flow in a duct are distributed in a ring in rectifier modules. It is in particular possible to distinguish such rectifier modules from structural, non-rectifier, modules, comprising radial arms between the casings, by the following features:

there are at least twenty radial arms or radial vanes in a rectifier module, whereas the structural modules have at most fourteen radial arms;

if an aerodynamic criterion is considered, which is referred to as spacing and is defined by the ratio of the chord length of the radial arms or vanes to the distance between two adjacent arms or vanes at the tip, the spacing value is greater than 0.8 for a rectifier module, whereas it is less than 0.5 for a non-rectifier module; and the angle of incidence that the radial vanes of a rectifier module have by following the shaft of the turbine engine depends on the fan propeller, but must be at least 15° to have a rectifying effect, whilst normally remaining less than 65°.

According to an aspect of the invention, the blades of the movable fan extend only between the inner casing and the outer casing of the turbine engine.

According to another aspect of the invention, the blades of the movable fan extend between the inter-duct casing and the outer casing of the turbine engine.

Preferably, the variable-pitch radial vanes are adapted, in a given pitch position, to block the circulation of air in the secondary duct and to permit the circulation of air in the primary duct.

Still preferably, each variable-pitch radial vane has an aerodynamic profile so as to accelerate the incident air flow in accordance with a laminar flow.

Preferably, each variable-pitch radial vane has a body which is movable in rotation about a radial axis so as to maintain an identical profile for each operating state of the turbine engine. An integral radial vane of this type is simple to manufacture.

According to another aspect of the invention, each variable-pitch radial vane has a fixed body and a movable flap, only the flap being moved depending on the operating state of the turbine engine. A radial vane of this type comprising a flap makes it possible to keep a leading edge oriented in an identical manner for each operating state, only the trailing edge being movable for precisely orienting the air flow on the movable fan.

Preferably, the cross-sectional area of the movable flap increases over its length from its root towards its tip so as to allow the circulation of an air flow in the secondary duct to be blocked while allowing an air flow to circulate in the primary duct. Therefore, the variable-pitch radial vanes allow an air-brake function to be provided, while allowing air to be fed to the turbine engine.

Advantageously, the control ring is movably mounted in rotation about a longitudinal axis of the turbine engine, on a fixed casing which limits the radial vanes at one of the radial ends thereof.

Preferably, the adjustment means are mounted on the fixed casing and comprise, for each radial vane:

a first connecting rod which is movably mounted in rotation about a first substantially radial pivot pin, which is mounted on the control ring, and about a second substantially radial pivot pin, which is mounted on the fixed casing, and a second connecting rod which is pivotally mounted about a third substantially radial pivot pin, which is connected to the vane and is offset along the longitudinal axis relative to a pitch pin of said radial vane, the second connecting rod being articulated to the first connecting rod so as to be able to pivot about a substantially radial hinge pin which is at a distance from the second pivot pin.

In the following description, the term "hinge pin" for a connecting rod refers to a pin which is pivotally connected to another connecting rod from the assembly of connecting rods and moving therewith, and in a different manner, the term "pivot pin" for a connecting rod refers to a pin which is pivotally connected to an element outside the assembly of connecting rods, for example a casing, a vane or a control ring.

In this case, a pitch pin is understood to mean a substantially radial pin about which the entire radial vane or a movable flap thereof rotates so as to orient itself according to the pitch angle.

Advantageously, said second connecting rod comprises means for changing a first distance, between the third pivot pin and said hinge pin. Also advantageously, the hinge pin is connected to the first connecting rod by connection means which are configured so as to be able to modify a second distance, between said hinge pin and the second pivot pin.

The device formed by these means makes it possible to adapt the pitch of the vanes by varying the range of motion thereof in azimuth with a single degree of freedom, the first and second distances forming two parameters which can be adjusted individually for each vane. Said device is particularly suitable for the case in which the distortion of the flow entering the turbine engine is caused by flight conditions, for example when said distortion is due to boundary layer ingestion. This mechanical device having a degree of freedom is advantageous in terms of reliability because, since it comprises a single actuator, it thus limits the risk of malfunctions. In addition, the system of the connecting rods can be adapted to the different cases described above of variable-pitch vanes which are integral or have a movable flap.

The invention also relates to such a turbine engine in which at least one of the parameters selected from a first distance, between the third pivot pin and said hinge pin, and a second distance, between said hinge pin and the second pivot pin, is different between at least two radial vanes.

Advantageously, for each radial vane, the second pivot pin and the pitch pin of said vane are located on the same side relative to the second connecting rod, in the direction of the longitudinal axis of the turbine engine. Preferably, the first pin is located on the opposite side relative to the second connecting rod, in the direction of the longitudinal axis of the turbine engine.

Advantageously, the second connecting rod is substantially perpendicular to the first connecting rod for at least one position of the control ring. Such an arrangement makes it possible to separate the influence of the two adjustable distances on the law of variation of the pitch of each vane.

The invention also relates to a method for adjusting the pitch of the vanes of a turbine engine as described above, when carrying out a maintenance operation or an adjustment of the turbine engine, comprising a step a) which consists in changing, for at least one vane, a first distance, between the third pivot pin and said hinge pin.

Preferably, the method also comprises a step b) which consists in changing, for at least one vane, a second distance, between said hinge pin and the second pivot pin.

Advantageously, in such a method, a first and a second position of the control ring being defined so as to correspond to a first and a second pitch of each vane, as a result of operating conditions of said turbine engine, a preliminary step consists in defining, for each vane, the values of said first and second adjustable distances, making it possible to obtain the first and second pitch respectively for the first and second positions of the control ring, said method then comprising for each vane a step a) and a step b) using the values defined in the preliminary step.

DESCRIPTION OF THE DRAWINGS

The invention will be better understood when reading the following description given solely by way of example and with reference to the accompanying drawings, in which.

It should be noted that the drawings disclose the invention in a detailed manner in order to carry out the invention, and said drawings can of course serve to give a better definition of the invention where appropriate.

DESCRIPTION OF ONE OR MORE EMBODIMENTS

Figure 2:
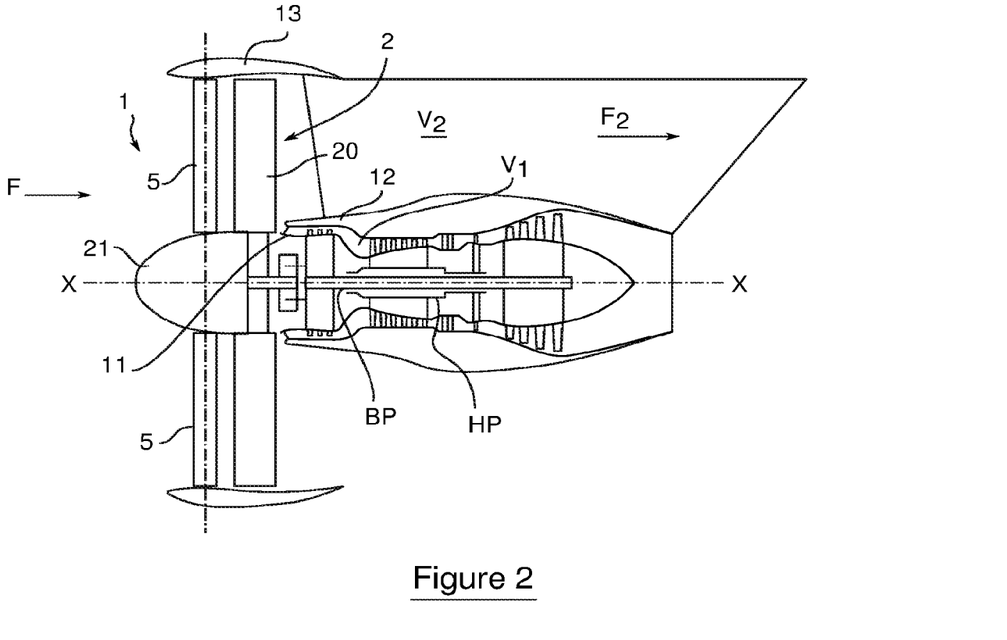
FIG. 2 is a section through a bypass turbine engine according to the invention.

With reference to FIG. 2, which is a schematic view of a turbine engine according to the invention for an aircraft, the turbine engine 1 extends axially along an axis X-X and comprises an inner casing 11, an inter-duct casing 12 and an outer casing 13 so as to define a primary duct V1 between the inter-duct casing 12 and the inner casing 11, and a secondary duct V2 between the inter-duct casing 12 and the outer casing 13. In other words, the secondary duct V2 and the primary duct V1 are annular and are separated by the inter-duct casing 12.

In this example, the turbine engine 1 comprises a low-pressure rotary shaft BP and a high-pressure rotary shaft HP, the low-pressure rotary shaft BP comprising, at the upstream end, a movable fan 2 comprising radial blades 20 of which the free ends face the outer casing 13 of the turbine engine so as to compress an incident air flow F at least in the secondary duct V2. In the example in FIG. 2, the movable fan 2 accelerates an air flow in the secondary duct V2 and in the primary duct V1.

The air flow circulating in the primary duct V1 is conventionally compressed by compressor stages before entering the combustion chamber. The combustion energy is recovered by turbine stages, which drive the compressor stages and the upstream movable fan 2 stage. The air flow circulating in the secondary duct V2 for its part is involved in providing the thrust of the turbine engine 1. In this example, the turbine engine 1 has a high bypass ratio, that is to say greater than 15. In order to provide the desired thrust with a turbine engine having a high bypass ratio, it is advantageously possible to reduce the rotational speed of the movable fan 2 to speeds of less than 340 m/s, for example of approximately 250 m/s to 300 m/s.

According to the invention, the turbine engine 1 comprises a plurality of fixed radial vanes or stator vanes 5 mounted upstream of the movable fan 2 so as to deflect the incident axial air F prior to it being axially rectified by the movable fan 2 in the secondary duct V2, as shown in FIG. 2. By way of example, the turbine engine comprises at least twenty circumferentially distributed radial stator vanes 5. With reference to FIG. 2, the radial stator vanes 5 extend in the same plane which is transverse to the axis of the turbine engine 1 between the inner casing 11 and the outer casing 13 of the turbine engine 1, so as to entirely deflect the incident axial flow F received by the turbine engine 1.

In this example, the turbine engine 1 comprises, upstream of the fan 2, a fixed axial cone 21 which is rigidly connected to the inner casing 11 and in which the plurality of radial stator vanes 5 are mounted. Preferably, the axial distance between the plurality of radial stator vanes 5 and the movable fan 2 is between 0.1 and 10 times the mean chord of a radial stator vane so as to optimise the rectification. Advantageously, this allows the distance between the radial stator vanes 5 and the movable fan 2 to be reduced in order to form a more compact turbine engine. In addition, owing to the compactness of the turbine engine 1, said engine may integrate a nacelle having reduced dimensions in place of the outer casing 13, that is to say the fan casing.

Figure 3A:
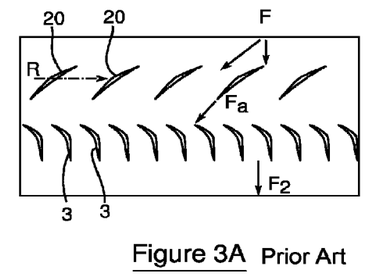
FIG. 3A is a schematic sectional view of the fan blades and of the fixed radial vanes or stator vanes for a turbine engine according to the prior art.

In the prior art, as shown in FIG. 3A, the incident axial air flow F received by the turbine engine 1 is first compressed by the blades 20 of the fan 2 in rotation in the direction R so that the deflected flow Fa has an axial and a tangential component. Then, the deflected flow Fa is axially rectified by radial stator vanes 3 of the OGV type, downstream of the movable fan 2, so that the air flow F2 circulating in the secondary duct V2 is oriented axially, as shown in FIG. 3A.

Figure 3B:
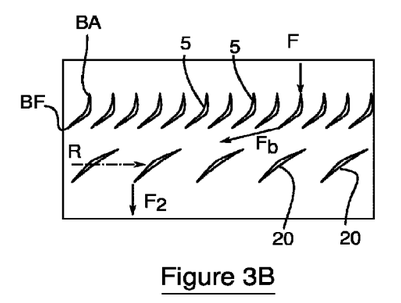
FIG. 3B is a schematic sectional view of the fan blades and of the fixed radial vanes or stator vanes for a turbine engine according to the invention.

According to the invention, the presence of radial stator vanes 5 upstream of the fan 2 allows the incident air flow F to be deflected prior to it being compressed by the movable fan 2. In fact, as shown in FIG. 3B, the plurality of radial stator vanes 5 mounted upstream of the movable fan 2 allow the incident air flow F to be deflected so that the deflected air flow Fb has an axial and a tangential component. Then, the deflected air flow Fb is axially rectified by the movable blades 20 and compressed so that the air flow F2 circulating in the secondary duct V2 is oriented axially, as shown in FIG. 3B. Advantageously, the air flow F2 output from the fan 2 only predominantly has an axial component.

In this example, each radial stator vane 5 has an elongate, preferably three-dimensional, shape, extending in a radial direction. Each radial stator vane 5 has a substantially constant chord over its length. Preferably, each radial stator vane 5 has an aerodynamic body having a leading edge BA and a trailing edge BF so as to, on one hand, deflect any incident air flow F received by the radial stator vane 5 and, on the other hand, accelerate the incident air flow in a continuous manner to maintain laminar flow. Preferably, the profile allows an acceleration of the incident air flow over at least 75% of the chord of the vane.

The radial stator vane 5 has a root mounted in the inter-duct casing 12 and a tip mounted in the outer casing 13 by connection means of the nut and bolt type, but other connection means may of course also be suitable.

According to the invention, the radial stator vanes 5 have a variable pitch so as to allow optimum deflection of the incident air flow F for each operating state of the turbine engine (take-off TO (FIG. 4), cruising C (FIG. 3B) or braking L (FIG. 5)). "Variable pitch" means the orientation of the stator vane 5 or a part of the stator vane 5 around a substantially radial axis.

Preferably, the pitch angle $\theta$ is defined by (passive or active) regulation depending on the operating state of the turbine engine 1. In this example, the pitch angle $\theta$ is determined by a computer on board the turbine engine and then communicated to an actuating device which modifies the pitch of the vane during operation of the turbine engine 1. By way of example, the actuating device comprises an actuator which moves a pitch wheel to which the radial stator vanes 5 are connected by a plurality of connecting rods. The actuating device could of course be in various different forms.

With reference to FIG. 3B, the pitch angle during cruising operation of the turbine engine 1 is determined depending on the rotational speed of the fan 20 during cruising, so that the downstream air flow F2 circulates axially in the secondary duct V2 to provide optimum thrust. In this example, the trailing edge BF of the radial stator vanes 5 is directed obliquely relative to a radial plane, as shown in FIG. 3B. In the following, the cruising pitch angle $\theta_C$ is used as a reference pitch angle and is shown by dotted lines in FIGS. 4 to 6.

Figure 4:
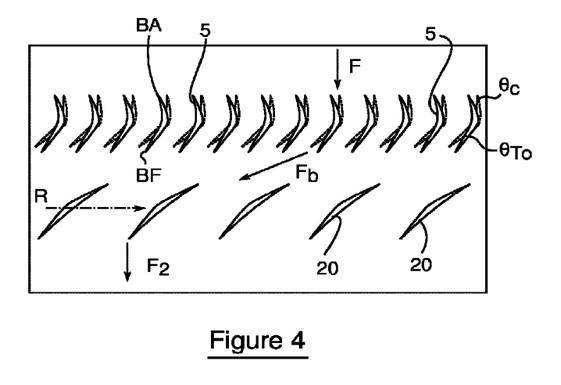
FIG. 4 is a schematic sectional view of the radial stator vanes during take-off.

With reference to FIG. 4, during take-off, the turbine engine 1 requires a large amount of air. For this purpose, the pitch angle $\theta_{TO}$ during take-off is adapted to promote axial circulation of the air flow Fb deflected by the radial stator vanes 5. In this example, the trailing edge BF of the radial stator vanes 5 is increased, that is to say brought closer to the axial position, in order to reduce the initial deflection, as shown in FIG. 4. Therefore, the incident air flow F is less deflected by the radial stator vanes 5, and this promotes a high flow rate of air for feeding the secondary duct V2.

Figure 5:
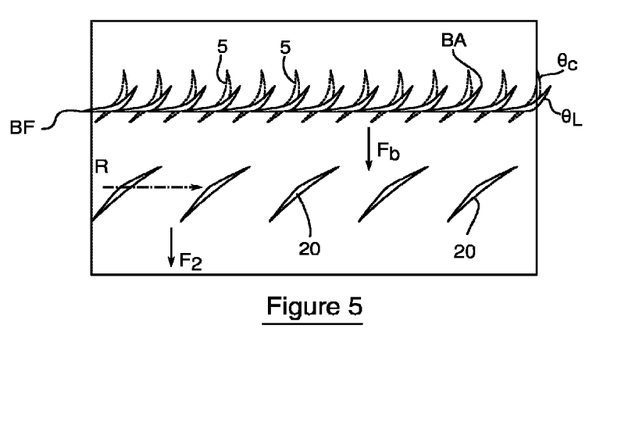
FIG. 5 is a schematic sectional view of the radial stator vanes during thrust inversion.

With reference to FIG. 5, when the aircraft brakes and in order to ensure thrust inversion, the turbine engine 1 requires a low amount of air. For this purpose, the pitch angle $\theta_L$ is adapted to limit the axial circulation of the air flow Fb deflected by the radial stator vanes 5. In this example, the trailing edge BF of the radial stator blades 5 is directed circumferentially, that is to say towards the plane which is transverse to the axis of the turbine engine as shown in FIG. 5, in order to limit (or stop) the amount of air provided to the movable fan 2. The radial stator vanes 5 having such a pitch angle $\theta_L$ further allow a planar transverse surface to be formed which comes up against the incident air flow F during braking. In other words, the radial stator vanes 5 form an air brake, which is very advantageous and avoids the use of auxiliary devices which are heavy and large (thrust inverter, etc.).

Preferably, when the stator vanes 5 are provided with a pitch for the braking of the aircraft, an incident air flow F can always circulate in the primary duct V1 in order to allow the turbine engine 1 to operate. Such a function is, for example, achieved by means of three-dimensional radial stator vanes 5 which cooperate for the pitch angle $\theta_L$ in order to form a plane for blocking the secondary duct V2, while allowing the air flow to circulate in the primary duct V1.

Figure 6:
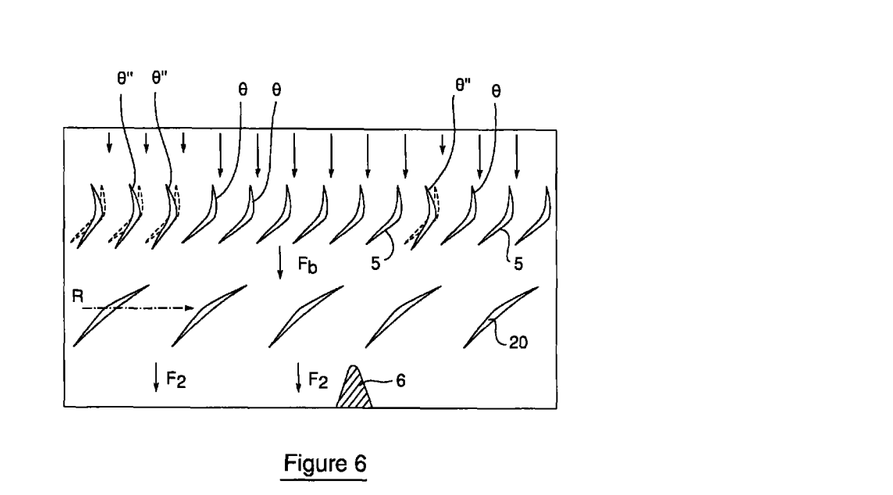
FIG. 6 is a schematic sectional view of the radial stator vanes when they are provided with an adaptive pitch.

According to an aspect of the invention, each radial stator vane 5 does not have the same pitch angle θ. With reference to FIG. 6, the pitch of the radial stator vanes 5 is produced adaptively so that the air flow F2 circulating in the secondary duct V2 extends axially so as to limit surge phenomena in the turbine engine. Preferably, the turbine engine 1 comprises means for individually adjusting the pitch of the radial stator vanes 5 so as to allow an adaptive pitch to be provided depending on the configuration of the turbine engine 1, for example if there is a strut 6 downstream of the movable fan.

As shown in FIG. 6, when the turbine engine comprises elements which limit the circulation of air downstream of the fan 2, the pitch angle θ of the stator vanes 5, which are aligned substantially longitudinally with these elements, is adapted. In fact, since the stator vanes 5 produce tangential deflection of the incident air flow, the vanes affected by an adaptive pitch depend on the standard pitch angle θ.

By way of example, the radial stator vane 5 which is aligned substantially longitudinally with a strut 6 of the turbine engine 1 has a pitch angle θ' which is different from that of the pitch angles θ of the other radial stator vanes 5. In fact, the pitch angle θ' is reduced to allow a greater amount of air to circulate in the turbine engine 1 in order to compensate the disruption from the strut 6. In other words, despite the presence of the strut 6, the axial air flow F2 circulating in the secondary duct V2 is homogenous downstream of the fan.

Still preferably, the turbine engine 1 comprises means for regulating the pitch of the radial stator vanes depending on whether heterogeneity of the air flow in the secondary duct V2 is detected. Therefore, if the pilot of an aircraft or a computer on-board the aircraft on which the turbine engine is mounted detects such heterogeneity, they may operate the regulating means to compensate this heterogeneity. For example, if the upstream flow is distorted (crosswind or boundary layer ingestion), the air flow in the secondary duct V2 downstream of the fan is homogenous owing to the adaptation. Such a circumferential adaptive pitch advantageously makes it possible to limit the risks of disengagement of or a surge in the turbine engine 1, and this improves the performance and the safety of said engine.

The pitch of the radial stator vanes 5 may be produced individually or in a grouped manner, for example a plurality of consecutive vanes having the same pitch. In other words, the stator vanes are provided with a pitch "block by block".

Figure 7A:
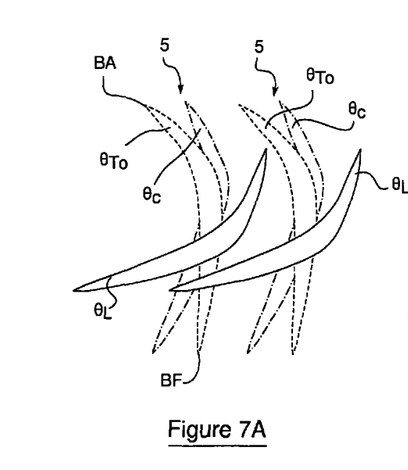
FIG. 7A is a schematic view of a plurality of pitch positions of an integral radial stator vane according to the invention having a movable body.

According to a first embodiment, each radial stator vane 5 has an integral body which is movable in rotation about a radial axis (FIG. 7A). Therefore, depending on the operating state of the turbine engine 1, the entire radial stator vane 5 is oriented about its axis of extension in order to have a pitch in accordance with the cruising pitch angle $\theta_C$, the take-off pitch angle $\theta_{TO}$ or the pitch angle when slowing down $\theta_L$.

In this first embodiment, the variable-pitch means of the radial stator vanes 5 are preferably located on one of the fixed structures, the outer casing 13 or the fixed axial cone 21, holding the vanes 5. A preferred embodiment is described below in which these means are located on the outer casing 13, without ruling out the possibility of said means being located on the fixed axial cone 21.

Figure 10:
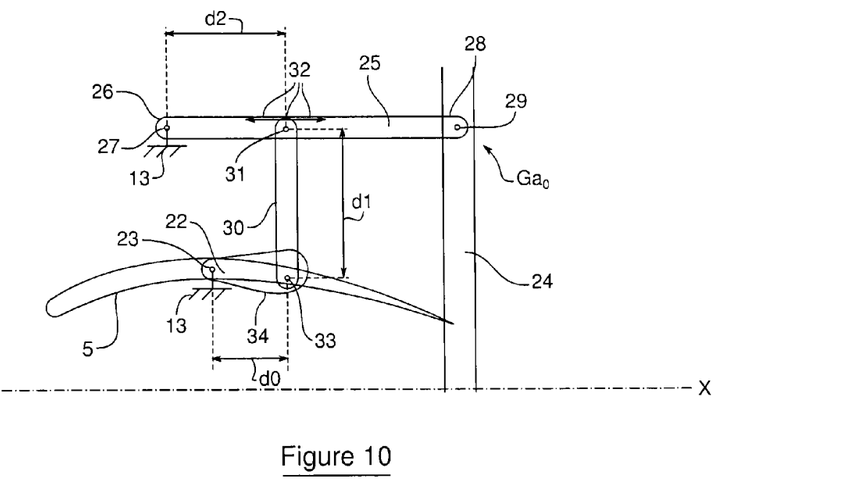
FIG. 10 is a schematic view, radially from above, of a radial stator vane and means for adjusting the pitch thereof according to the invention.

In this embodiment, with reference to FIG. 10, each radial stator vane 5 is movably mounted in rotation about a substantially radial pitch pin 23 on a pivot means 22 which is rigidly connected to the outer casing 13, said pitch pin 23 opening out radially on the outside of the casing 13. In addition, a control ring 24 is movably mounted in rotation relative to the longitudinal axis X-X of the turbine engine, on the radially external wall of the casing 13, downstream of the pitch pin 23 of the vane 5.

A first connecting rod 25 is movably mounted, at one of the ends 28 thereof, in rotation about a first substantially radial pivot pin 29 which is rigidly connected to the first control ring 24, and, at the other end 26 thereof, about a second substantially radial pivot pin 27 which is mounted on the radially external wall of the outer casing 13.

The first pivot pin 29 may be, for example, a pin 29 which is inserted in a longitudinal slot at the end 28 of the connecting rod 25. In this way, when the first control ring 24 rotates, the movement of the pin 29 can drive the connecting rod 25 in rotation about the second pivot pin 27, at the other end 26 thereof.

The second pivot pin 27 of the first connecting rod 25 is offset in azimuth in relation to the pitch pin 23 of the vane 5 and, in this case, upstream thereof.

In this case, the first connecting rod 25 is substantially aligned with the longitudinal axis X-X of the turbine engine, and is therefore substantially perpendicular to the control ring 24 for a position Ga of said ring which corresponds to a mean pitch of the vane 5.

A second connecting rod 30 is pivotally mounted on the first connecting rod 25 about a first and single hinge pin 31 between the two connecting rods, close to one of the ends thereof. Means 32 supporting said hinge pin 31 can be configured in such a way that the hinge pin 31 can be moved on the first connecting rod 25. Said means may be for example successive holes in the first connecting rod 25 into which a hinge pin can be inserted for fixed positions. Said means may also be a means which is mounted on a collar surrounding the connecting rod 25, for continuous movement.

The second connecting rod 30 is articulated, close to the other end thereof, so as to be able to pivot about a third pivot pin 33 which is mounted on the vane 5. The third pivot pin 33 is arranged at a non-zero distance d0 from the pitch pin 23 of the vane 5, in such a way as to provide a lever arm which makes it possible to convert the movement of the second connecting rod 30 into a rotational movement of the vane 5, and thus into a modification of the pitch angle θ thereof. This offset can be provided by a connecting rod 34 which is fixed relative to the vane or by any other means. In this case, the third pivot pin 33 is located substantially on the chord of the vane 5, but this example is non-limiting. In the example shown, the third pivot pin 33 is located downstream of the pitch pin 23 of the radial vane 5.

In addition, in this case, the second connecting rod 30 is mounted in such a way that it is substantially perpendicular to the first connecting rod 25 for a position of the control ring 24 which corresponds to a mean pitch of the vane 5.

In the case of such an assembly, in order to vary the pitch angle A of each vane 5, a control variable Ga, which corresponds to the position of the control ring 24 when it rotates about the axis X, and two adjustable parameters for modifying the influence of the control variable Ga, are used.

A first parameter corresponds to the distance d1, on the second connecting rod 30, between the first pivot pin 33 and the hinge pin 31 with the first connecting rod 25. This distance d1 has an immediate influence, as can be seen from FIG. 10, on the pitch angle of the vane 5 for a given position Ga of the control ring 24.

This distance d1 can be modified, for example, either by changing the second connecting rod 30, or by installing means which make it possible to move the third pivot pin 33 on the second connecting rod 30, similarly to the movable means 32 being able to be installed on the first connecting rod 25.

Figure 11A:
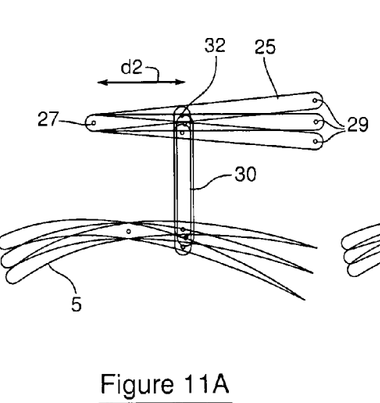
FIGS. 11A and 11B are schematic views of a plurality of pitch positions of a vane shown in FIG. 10, having different geometric parameters for the adjustment means.
Figure 11B:
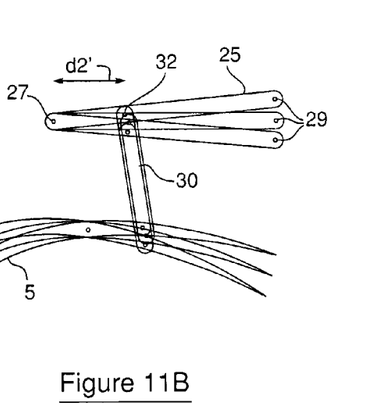

The second parameter relates to the distance d2, on the first connecting rod 25, between the second pivot pin 27, on the casing 13, and the hinge pin 31 with the second connecting rod 30. Said second parameter is more particularly linked to a multiplication factor of the range of the variations in the pitch angle θ of the vane 5 in relation to the variations in position Ga of the control ring 24. FIGS. 11A and 11B show this phenomenon for two positions of the hinge pin 31. The position of the hinge pin 31 corresponding to a certain distance d'2, with reference to FIG. 11B, leads to smaller ranges than the other position, corresponding to a greater distance d2, with reference to FIG. 11A.

Figure 12A:
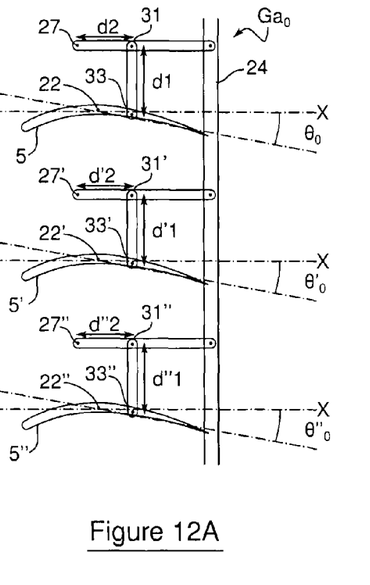
FIG. 12A shows a plurality of successive radial stator vanes equipped with adjustment means, as shown in FIG. 10.
Figure 12B:
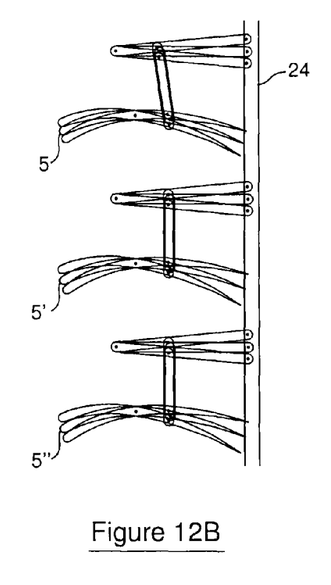
FIG. 12B shows different positions of the vanes in FIG. 12A for different positions of the control ring.

As shown in FIG. 12A, the variable-pitch stator vanes 5, 5', 5" can be organised in a grid in a conventional manner in front of the control ring 24. The geometries thereof are similar, and the first 29, 29', 29", second 27, 27', 27" and third 33, 33', 33" pivot pins are located in the same relative positions. By contrast, for each connecting rod, the distances d1, d'1, d"1 on the second connecting rods 30; 30', 30" and d2, d'2, d"2 on the first connecting rods 25, 25', 25" are adjusted according to the desired variations for the pitch of each vane 5, 5', 5". FIG. 12A shows the pitch values $\theta_0$, $\theta'_0$, $\theta''_0$ of the vanes 5, 5', 5" obtained for a mean position of the control ring 24 with values of these parameters. FIG. 12B shows the result obtained on the pitch variations θ, θ', θ" of the different vanes 5, 5', 5" for different positions of the control ring 24.

In addition, in this case, the fact that the first 25 and second 30 connecting rods are substantially perpendicular for a mean control position $Ga_0$ makes it possible to decouple, as a first approximation, the effects of the two parameters d1, d2 for small movements. It is therefore possible, for example, to adjust a mean pitch of the vane 5 by adjusting the length d1 of the second connecting rod 30, then to adjust the range of the pitch variations by adjusting the distance d2 on the first connecting rod 25 between the second pivot point 27 and the hinge pin 31.

More generally, for small movements, it is possible to model the relationship between the vector C of the pitch angles θ, θ', θ" of the vanes 5, 5', 5" and the position Ga of the control ring 24, defined by the movement thereof about a mean position $Ga_0$, using a linear transformation:

$$C = R + Amp \cdot Ga$$

In this function, a vector R of the mean pitch of the vanes 5, 5', 5" intervenes for the mean position of the control ring Ga and the vector Amp defining the multiplication factor between the variation range of the pitch angles θ, θ', θ" of the vanes 5, 5', 5" and the movement Ga of the control ring 24.

This embodiment makes it possible for example to adjust the pitch of each vane 5, 5', 5" to two flight conditions for which it is desirable to optimise the operation of the turbine engine, whilst ensuring that the pitch angle θ, θ', θ" of the vanes 5, 5', 5" remains between these two values for intermediate operating conditions.

For this purpose, a first position $Ga_1$ of the control ring 24, which position corresponds to first operating conditions, and a second position $Ga_2$ of the control ring 24, which position corresponds to second operating conditions, are defined. Preferably, these two positions $Ga_1$ and $Ga_2$ are selected so as to be close in order to be able to process small movements. More preferably, said positions are selected such that they surround a mean position $Ga_0$ of the control ring for which the first 25 and second 30 connecting rods form an angle which is close to 90° for the vanes 5, 5', 5" of the stator.

The values of the distances d1, d'1, d"1 and d2, d'2, d"2 are then determined for each radial vane 5, 5', 5" providing the components of the vectors R and Amp, making it possible to obtain the desired pitch angles $\theta_1$, $\theta'_1$, $\theta''_1$ for the position $Ga_1$ and $\theta_2$, $\theta'_2$, $\theta''_2$ for the position $Ga_2$ of the control ring 24.

In subsequent steps, the distance d1, d'1, d"1 on the second connecting rod 30, 30', 30" and the distance d2, d'2, d"2 on the first connecting rod 25, 25', 25" are adjusted for each radial vane 5, 5', 5" to the values found above. In this case, the term adjusting corresponds either to using adjustment means which have previously been installed on the first 25, 25', 25" and second 30, 30', 30" connecting rods, or to installing first 25, 25', 25" and second 30, 30', 30" connecting rods having the required geometry.

Figure 13:
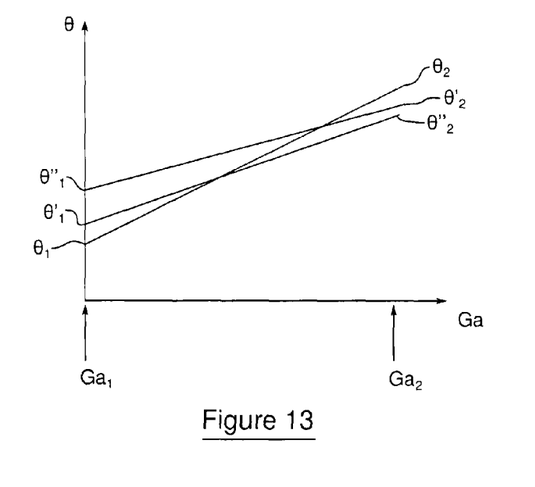
FIG. 13 is a diagram of the change in the pitch of a plurality of vanes as shown in FIGS. 12A and 12B, as a function of the position of the control ring.

When the adjustments are complete, the variations in the pitch angle θ, θ', θ" of the vanes 5, 5', 5" follows the result shown in FIG. 13 as a function of the position Ga of the control ring 24.

The aim of this example is in particular to adapt the pitch variations of the vanes 5, 5', 5" to types of operating conditions of the turbine engine where it is possible to anticipate that the extent of the distortion of air flow entering the turbine engine will depend primarily on the flight power.

This may be the case in particular for correcting the effects of the ingestion of a boundary layer by the turbine engine. There is a lack of distortion due to the boundary layer ingestion at low speed (landing or take off) and, by contrast, high distortion in cruising flight. It is therefore possible to adjust the pitch of the vanes:

by associating the first control position $Ga_1$ with low-speed flight, for which no azimuth pitch variation of the vanes is necessary, and by associating the second control position $Ga_2$ with cruising flight, for which azimuth pitch variation of the vanes is carried out in order to correct distortion.

In this case, the diagram in FIG. 13 would start with an identical pitch of the different vanes 5, 5', 5" for the first pitch position $Ga_1$ of the control ring 24.

Figure 7B:
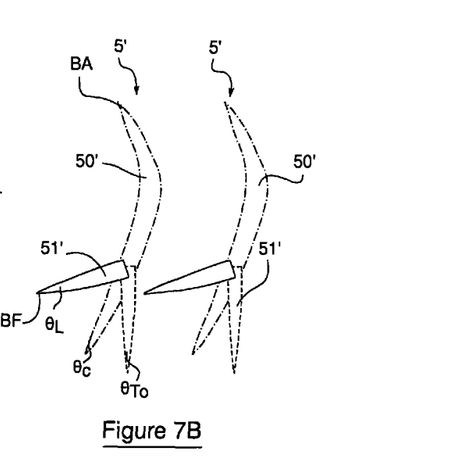
FIG. 7B is a schematic view of a plurality of pitch positions of an integral radial stator vane according to the invention having a fixed body and a movable flap.
Figure 8:
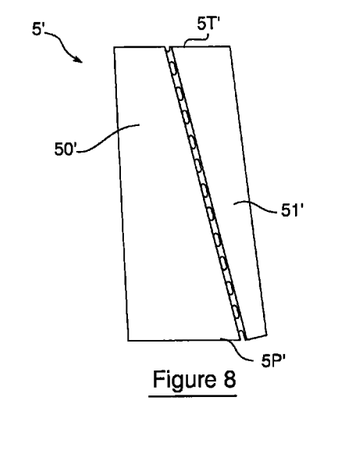
FIG. 8 is a schematic side view of a radial stator vane according to the invention having a fixed body and a movable flap.

According to a second embodiment, each radial stator vane 5' has a fixed body 50' and a movable flap 51', as shown in FIGS. 7B and 8. Preferably, the flap 51' includes the trailing edge BF of the radial vane 5' and is articulated about an axis on the body 50' of the vane 5' which remains fixed. In this example, the movable flap 51' has a cross section which increases over its length, as shown in FIG. 8. Preferably, the cross section increases from the root 5P' of the stator vane 5 to its tip 5T, as shown in FIG. 8, to allow the secondary duct V2 to be blocked in the pitch position $\theta_L$ during landing, while allowing the primary duct V1 to be fed.

The embodiment of the variable-pitch means of the vanes described above can be adapted to this second embodiment in which the pitch pin 23 drives a movable flap 51'. By influencing the articulations between the connecting rods 30, such a means can be adapted to a rotating shaft of the movable flap 51' which is slightly inclined relative to the radial direction, as indicated in FIG. 8.

Figure 9:
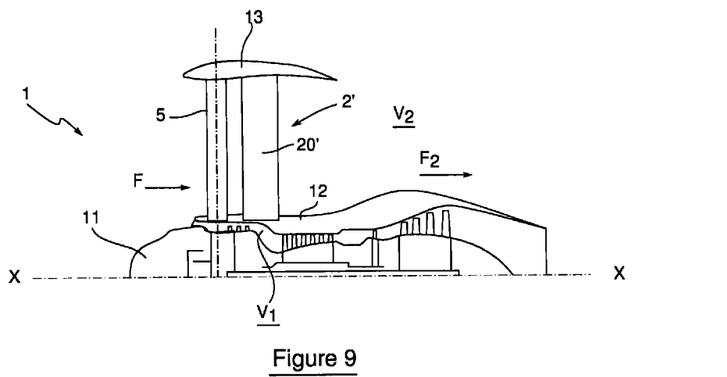
FIG. 9 is a cross section through another embodiment of a bypass turbine engine according to the invention.

According to another embodiment of the invention, with reference to FIG. 9, the movable fan 2' comprises movable blades 20' which extend radially between the inter-duct casing 12 and the outer casing 13 so as to compress an air flow exclusively in the secondary duct V2, the primary duct V1 not receiving an air flow compressed by the movable fan 2'. As a result, the radial stator vanes 5 are mounted between the inter-duct casing 12 and the outer casing 13 in order to deflect the incident air flow F prior to it being compressed by the movable fan 2'. The radial stator blades 5 may of course be integral or may comprise a movable flap in this configuration of the turbine engine 1.

The embodiment of the variable-pitch means of the vanes as described for the first embodiment can be directly transposed in this case by installing said means either on the outer casing 13 or on the inter-duct casing 12.

The invention claimed is:

1. A bypass turbine engine in which air flows circulate from upstream to downstream, the turbine engine extending axially and comprising:
   an inner casing, an inter-duct casing, and an outer casing so as to define a primary duct between the inter-duct casing and the inner casing, and a secondary duct between the inter-duct casing and the outer casing;
   a rotary shaft comprising, at an upstream end of the rotary shaft, a movable fan comprising radial blades of which free ends face the outer casing of the turbine engine so as to compress an air flow at least in the secondary duct;
   at least one element mounted downstream of the movable fan;
   a plurality of variable-pitch radial stator vanes mounted upstream of the movable fan, said variable-pitch radial stator vanes being configured to deflect axial incident air and the movable fan being configured to axially rectify said deflected air into the secondary duct; and
   an adjusting system which individually adjusts a pitch of the variable-pitch radial stator vanes so as to allow an adaptive pitch to be provided depending on a configuration of the turbine engine,
   wherein the element is substantially aligned longitudinally with a first set of the variable-pitch radial stator vanes including at least one of the variable-pitch radial stator vanes, the pitch of each variable-pitch radial stator vane of the first set of the variable-pitch radial stator vane being adjusted individually and being different from the pitch of a second set of variable-pitch radial stator vanes including all of the variable-pitch radial stator vanes not in the first set of variable-pitch radial stator vanes.

2. The turbine engine according to claim 1, wherein the inner casing, the inter-duct casing, and the outer casing are at a radial distance from one another in the turbine engine so as to define a turbine engine having a bypass ratio that is equal to 15.

3. The turbine engine according to claim 1, wherein a rotational speed of the free ends of the blades of the movable fan is less than 340 m/s.

4. The turbine engine according to claim 1, wherein the plurality of variable-pitch radial stator vanes extend in a same plane which is transverse to an axis of the turbine engine.

5. The turbine engine according to claim 1, wherein an axial distance between the plurality of variable-pitch radial stator vanes and the movable fan is between 0.1 and 10 times a mean chord of a variable-pitch radial stator vane.

6. The turbine engine according to claim 1, wherein the blades of the movable fan extend between the inner casing and the outer casing of the turbine engine.

7. The turbine engine according to claim 1, wherein each variable-pitch radial stator vane has an aerodynamic profile so as to accelerate flow of the incident air in accordance with a laminar flow.

8. The turbine engine according to claim 1, wherein each variable-pitch radial stator vane has a body which is movable in rotation about a radial axis.

9. The turbine engine according to claim 1, wherein each variable-pitch radial stator vane has a fixed body and a movable flap.

10. The turbine engine according to claim 1, wherein the plurality of variable-pitch radial stator vanes forms a planar transverse surface at a given pitch position of each of the variable-pitch radial stator vanes.

11. The turbine engine according to claim 1, wherein the adjusting system includes a single control ring, a first connecting rod, and a second connecting rod, a first end of the first connecting rod being connected to the control ring, a first end of the second connecting rod being connected to the first connecting rod, and a second end of the second connecting rod being connected to one of the variable-pitch radial stator vanes.

12. The turbine engine according to claim 1, wherein the element comprises a strut.

13. The turbine engine according to claim 1, wherein the control ring is movably mounted in rotation about a longitudinal axis of the turbine engine on one of the inner casing or the outer casing.

14. The turbine engine according to claim 13, wherein the first connecting rod is movably mounted in rotation about a first substantially radial pivot pin, which is mounted on the control ring, and about a second substantially radial pivot pin, which is mounted on the fixed casing, a the second connecting rod is pivotally mounted about a third substantially radial pivot pin, which is connected to the one of the variable-pitch radial stator vanes and offset along the longitudinal axis in relation to a pitch pin of said one of the variable-pitch radial stator vanes, the second connecting rod being articulated to the first connecting rod so as to be able to pivot about a substantially radial hinge pin which is at a distance from the second pivot pin.

15. The turbine engine according to claim 14, wherein said second connecting rod comprises means for modifying a first distance, between the third pivot pin and said hinge pin.

16. The turbine engine according to claim 14, wherein the hinge pin is connected to the first connecting rod by connection means which are configured so as to be able to modify a second distance, between said hinge pin and the second pivot pin.

17. The turbine engine according to claim 14, wherein at least one of the parameters selected from a first distance, between the third pivot pin and said hinge pin, and a second distance, between said hinge pin and the second pivot pin, is different between at least two variable-pitch radial stator vanes.

18. The turbine engine according to claim 14, wherein the second connecting rod is substantially perpendicular to the first connecting rod for at least one position of the control ring.

19. The turbine engine according to claim 14, wherein the second pivot pin and the pitch pin of said one of the variable-pitch radial stator vanes are located on a same side relative to the second connecting rod, in a direction of the longitudinal axis of the turbine engine.

20. The turbine engine according to claim 19, wherein the first pivot pin is located on an opposite side relative to the second connecting rod, in the direction of the longitudinal axis of the turbine engine.

21. Method A method for adjusting the pitch of radial stator vanes of a turbine engine according to claim 14, when carrying out a maintenance operation or an adjustment of the turbine engine, comprising:
   modifying a first distance between the third pivot pin and said hinge pin.

22. The method according to claim 21, further comprising modifying a second distance between said hinge pin and the second pivot pin.

23. The method according to claim 22, wherein, a first position and a second position of the control ring are defined so as to correspond to a first pitch angle and a second pitch angle of the one of the variable-pitch radial stator vanes, as a result of operating conditions of said turbine engine, the method further comprising defining values of said first and second distances based on the first and second pitch angles respectively for the first and second positions of the control ring.

24. A bypass turbine engine in which air flows circulate from upstream to downstream, the turbine engine extending axially and comprising:
   an inner casing, an inter-duct casing, and an outer casing so as to define a primary duct between the inter-duct casing and the inner casing, and a secondary duct between the inter-duct casing and the outer casing;
   a rotary shaft comprising, at an upstream end of the rotary shaft, a movable fan comprising radial blades of which free ends face the outer casing of the turbine engine so as to compress an air flow at least in the secondary duct
   a plurality of variable-pitch radial stator vanes mounted upstream of the movable fan, said variable-pitch radial stator vanes being configured to deflect axial incident air and the movable fan being configured to axially rectify said deflected air into the secondary duct, and
   an adjusting system which individually adjusts a pitch of a variable-pitch radial stator vane of said variable pitch radial stator vanes so as to allow an adaptive pitch to be provided depending on a configuration of the turbine engine,
   wherein each of the variable-pitch radial stator vanes extends radially between the inter-duct casing and the outer casing to which the variable-pitch radial stator vanes are fixed, and
   wherein said adjusting system includes a single control ring and rods for connecting said control ring to each of said variable-pitch radial stator vanes.

25. A bypass turbine engine in which air flows circulate from upstream to downstream, the turbine engine extending axially and comprising:
   an inner casing, an inter-duct casing, and an outer casing so as to define a primary duct between the inter-duct casing and the inner casing, and a secondary duct between the inter-duct casing and the outer casing;
   a rotary shaft comprising, at an upstream end of the rotary shaft, a movable fan comprising radial blades of which free ends face the outer casing of the turbine engine so as to compress an air flow at least in the secondary duct;
   a plurality of variable-pitch radial stator vanes mounted upstream of the movable fan, said variable-pitch radial stator vanes being configured to deflect axial incident air and the movable fan being configured to axially rectify said deflected air into the secondary duct; and
   an adjusting system which individually adjusts a pitch of the variable-pitch radial stator vanes so as to allow an adaptive pitch to be provided depending on a configuration of the turbine engine,
   wherein the adjusting system includes a single control ring, a first connecting rod, and a second connecting rod, a first end of the first connecting rod being connected to the control ring, a first end of the second connecting rod being connected to the first connecting rod, and a second end of the second connecting rod being connected to one of the variable-pitch radial stator vanes.

* * * * *

UNITED STATES PATENT AND TRADEMARK OFFICE
CERTIFICATE OF CORRECTION

PATENT NO. : 9,879,561 B2
APPLICATION NO. : 14/626452
DATED : January 30, 2018
INVENTOR(S) : Jean-Loic Herve Lecordix et al.

It is certified that error appears in the above-identified patent and that said Letters Patent is hereby corrected as shown below:

In the Specification

Column 10, Line 61, change "angle A of each" to --angle $\theta$ of each--.

Signed and Sealed this
Fourteenth Day of April, 2020

Andrei Iancu
*Director of the United States Patent and Trademark Office*